(12) United States Patent
Wernersson

(10) Patent No.: US 8,213,734 B2
(45) Date of Patent: Jul. 3, 2012

(54) ACTIVE AUTOFOCUS WINDOW

(75) Inventor: Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 996 days.

(21) Appl. No.: 11/551,801

(22) Filed: Oct. 23, 2006

(65) Prior Publication Data

US 2008/0007626 A1 Jan. 10, 2008

Related U.S. Application Data

(60) Provisional application No. 60/818,960, filed on Jul. 7, 2006.

(51) Int. Cl.
*G06K 9/40* (2006.01)

(52) U.S. Cl. ........ 382/255; 382/159; 382/170; 382/173; 382/175; 382/180; 382/204; 382/224; 382/254; 382/100

(58) Field of Classification Search .................. None
See application file for complete search history.

(56) References Cited

U.S. PATENT DOCUMENTS

| | | | | |
|---|---|---|---|---|
| 4,624,013 A | * | 11/1986 | Urushibata | 382/180 |
| 4,791,676 A | * | 12/1988 | Flickner et al. | 382/204 |
| 4,887,302 A | * | 12/1989 | Urushibata | 382/180 |
| 5,018,214 A | * | 5/1991 | Pasch | 382/180 |
| 5,199,083 A | * | 3/1993 | Takeda | 382/180 |
| 5,239,596 A | * | 8/1993 | Mahoney | 382/180 |
| 5,305,393 A | * | 4/1994 | Kawai et al. | 382/180 |
| 5,521,695 A | | 5/1996 | Cathey et al. | |
| 5,602,940 A | * | 2/1997 | Inoue et al. | 382/180 |
| 5,625,415 A | | 4/1997 | Ueno et al. | |
| 5,748,371 A | * | 5/1998 | Cathey et al. | 359/558 |
| 5,937,091 A | * | 8/1999 | Yanagishita et al. | 382/180 |
| 6,038,335 A | * | 3/2000 | Yokoyama et al. | 382/141 |
| 6,154,574 A | * | 11/2000 | Paik et al. | 382/255 |
| 6,370,277 B1 | * | 4/2002 | Borrey et al. | 382/260 |
| 6,643,400 B1 | * | 11/2003 | Murakawa et al. | 382/195 |

(Continued)

FOREIGN PATENT DOCUMENTS

EP 1 017 232 7/2000

(Continued)

OTHER PUBLICATIONS

Ran Ng et al., "Light Field Photography with a Hand-Held Plenoptic Camera", Stanford Tech Report CTSR Feb. 2005, pp. 1-11.

(Continued)

*Primary Examiner* — Chan S Park
*Assistant Examiner* — Avinash J Yentrapati
(74) *Attorney, Agent, or Firm* — Harrity & Harrity, LLP

(57) ABSTRACT

A method for changing the depth at which an image is focused is provided in a portable imaging device that includes an image recording arrangement that has a lens system, an image sensor for recording images, and a display arrangement for presentation of the recorded images. The method includes moving a movable focusing frame covering a part of a recorded image presented on the display to identify an area of interest in the presented image. The method also includes analyzing the image within the frame to obtain a setting required to focus the image within the frame and applying the obtained setting to the full presented image to focus the presented image at the depth defined by the current position of the movable focusing frame.

16 Claims, 4 Drawing Sheets

U.S. PATENT DOCUMENTS

| | | | |
|---|---|---|---|
| 6,812,968 B1* | 11/2004 | Kermani | 348/345 |
| 6,853,738 B1* | 2/2005 | Nishigaki et al. | 382/106 |
| 7,254,268 B2* | 8/2007 | Zhao et al. | 382/190 |
| 7,693,341 B2* | 4/2010 | Pettigrew et al. | 382/254 |
| 8,005,265 B2* | 8/2011 | Steinberg et al. | 382/103 |
| 2002/0063893 A1* | 5/2002 | Fujieda | 358/1.15 |
| 2003/0076991 A1* | 4/2003 | Nishide | 382/154 |
| 2003/0081836 A1* | 5/2003 | Averbuch et al. | 382/199 |
| 2003/0161518 A1* | 8/2003 | Vuylsteke | 382/128 |
| 2003/0202688 A1* | 10/2003 | Sakaida | 382/128 |
| 2005/0163381 A1* | 7/2005 | Ozaki et al. | 382/199 |
| 2005/0189419 A1 | 9/2005 | Igarashi et al. | |
| 2005/0220357 A1* | 10/2005 | Rifu | 382/255 |
| 2006/0045371 A1* | 3/2006 | Li | 382/254 |
| 2006/0062484 A1 | 3/2006 | Aas et al. | |
| 2006/0204055 A1* | 9/2006 | Steinberg et al. | 382/118 |
| 2006/0269150 A1* | 11/2006 | Lee | 382/232 |
| 2007/0237415 A1* | 10/2007 | Cao et al. | 382/254 |
| 2007/0247679 A1* | 10/2007 | Pettigrew et al. | 358/518 |
| 2007/0248266 A1* | 10/2007 | Matsuno | 382/180 |
| 2007/0253623 A1* | 11/2007 | Ohira et al. | 382/218 |
| 2009/0179998 A1* | 7/2009 | Steinberg et al. | 348/222.1 |

FOREIGN PATENT DOCUMENTS

| | | |
|---|---|---|
| JP | 2004038669 A * | 2/2004 |
| JP | 2006-157171 | 6/2006 |
| JP | 2006157171 * | 6/2006 |

OTHER PUBLICATIONS

PCT Search Report and Written Opinion, Mar. 21, 2007, 13 pages.

* cited by examiner

ACTIVE AUTOFOCUS WINDOW

RELATED APPLICATION

This application claims priority under 35 U.S.C. §119 based on U.S. Provisional Application Ser. No. 60/818,960, filed Jul. 7, 2006, the disclosure of which is hereby incorporated herein by reference.

TECHNICAL FIELD OF THE INVENTION

The present invention relates to the field of portable devices that include an imaging system. More particularly, the invention relates to a portable communication device that includes an imaging system and selecting the focus area within an image in an imaging system.

DESCRIPTION OF RELATED ART

It is well known to those skilled in the art of portable imaging devices that the correct focus of an image can be maintained by means of a so-called autofocus arrangement. The speed and accuracy of an autofocusing arrangement are typically superior to a manual adjustment of the focus.

The autofocusing arrangements are typically based on either an active system or a passive system. The active systems usually work in two steps by performing a distance measuring (e.g., based on ultrasonic sound waves or infrared light or similar) separated from the optical system and then a focus adjustment of the optical system based on the measured distance. In contrast, passive systems do not rely on transmissions (e.g., in the form of electromagnetic rays or sound waves, etc.) from the camera towards the object to be recorded. Instead, these systems utilize the light that is naturally reflected by the object. A passive autofocusing can be achieved by, e.g., phase detection or contrast measurement.

Even if some known autofocusing systems may be superior to a manual adjustment of the focus, they are still too slow in many situations making it difficult to capture fast changing events in focus, which potentially results in images that are out of focus and an increased risk of losing precious events that pass before an image can be focused and recorded.

In addition, known autofocusing systems typically utilize a focus window or similar that has to be aimed towards the object on which the image should be focused. If the focus window is aimed otherwise, there is no guarantee that the desired object will be in focus in the recorded image.

In view of the above, it would be beneficial to provide the user of a portable imaging device with an efficient and flexible procedure for focusing an image at a desired depth. In particular, it would be beneficial to provide a simple, flexible and intuitive focusing procedure.

SUMMARY OF THE INVENTION

Aspects of the present invention are directed to solving the problem of providing a user of a portable imaging device with an efficient and flexible procedure for focusing an image at a desired depth. In particular, aspects described herein provide a simple, flexible and intuitive focusing procedure.

According to a first aspect of the invention, a method for changing the depth at which an image is focused in a portable imaging device is provided. The portable device comprises an image recording arrangement comprising a lens system and an image sensor for recording images. In addition, the portable device comprises a display arrangement for presentation of the recorded images, The method performed by the portable device may comprise the step of: moving a movable focusing frame covering a part of a recorded image presented on the display so as to identify an area of interest in the presented image; analyzing the image within the frame to obtain a setting required to focus the image within the frame; applying the obtained setting to the full presented image so as to focus the presented image at the depth defined by the current position of the movable focusing frame.

According to a second aspect of the invention, the step of analyzing the image within the frame to obtain said setting may comprise the further steps of: obtaining a plurality of intermediate images from the presented image, wherein each intermediate image is focused at an unique distance within the presented image; determining the setting for the intermediate image that provides the sharpest image within the focusing frame.

According to a third aspect of the invention, the presented image is recorded by a plenoptic camera arrangement, and the intermediate images are obtained by computing a plurality of synthetic camera settings, wherein each setting produces an image focused at a unique distance in the presented image.

According to a fourth aspect of the invention, the presented image is recorded by a wavefront coding arrangement, and the intermediate images are obtained by using a plurality of filter settings, wherein each setting produces an image focused at a unique distance in the presented image.

According to a fifth aspect of the invention, the step of analyzing the image within the frame to obtain said setting comprises the further steps of: dividing the image within the frame into sub-images of a predetermined size; estimating an edge direction of each of the divided sub-images; calculating step responses for respective edge directions; obtaining a mean step response by averaging a predetermined number of the step responses; obtaining Point Spread Function (PSF) coefficients using the mean step response; obtaining an image blur transfer function using the PSF coefficients; obtaining an image restoration transfer function setting using the image blur transfer function.

According to a sixth aspect of the invention, moving the focusing frame is done by means of a keypad comprised by said portable imaging device.

According to a seventh aspect of the invention, the size of the focusing frame can be changed by means of said keypad.

According to an eighth aspect of the invention, said portable device is a cell phone.

According to a ninth aspect of the invention, a portable imaging device provided with an image recording arrangement comprises a lens system and an image sensor for recording images. In addition, the portable device comprises a display for presentation of the recorded images, and an image processing unit for changing the depth at which an image is focused in the portable imaging device. The image processing unit is arranged to operatively: move a movable focusing frame covering a part of a recorded image presented on the display so as to identify an area of interest in the presented image; analyze the image within the frame to obtain a setting required to focus the image within the frame; apply the obtained setting to the full presented image so as to focus the presented image at the depth defined by the current position of the movable focusing frame.

According to a tenth aspect of the invention, the image processing unit analyzes the image within the frame to obtain said setting by being arranged to operatively: obtain a plurality of intermediate images from the presented image, wherein each intermediate image is focused at an unique distance within the presented image; determine the setting for the intermediate image that provides the sharpest image within the focusing frame (400).

According to an eleventh aspect of the invention, the presented image is recorded by a plenoptic camera arrangement and the image processing unit is arranged to operatively obtain the intermediate images by computing a plurality of synthetic camera settings, wherein each setting produces an image focused at a unique distance in the presented image.

According to a twelfth aspect of the invention, the presented image is recorded by a wavefront coding arrangement and the image processing unit is arranged to operatively obtain the intermediate images by using a plurality of filter settings, wherein each setting produces an image focused at a unique distance in the presented image.

According to a thirteenth aspect of the invention, the image processing unit analyzes the image within the frame to obtain said setting by being arranged to operatively: divide the image within the frame into sub-images of a predetermined size; estimate an edge direction of each of the divided sub-images; calculate step responses for respective edge directions; obtain a mean step response by averaging a predetermined number of the step responses; obtain Point Spread Function (PSF) coefficients using the mean step response; obtain an image blur transfer function using the PSF coefficients; obtain an image restoration transfer function setting using the image blur transfer function.

According to a fourteenth aspect of the invention, the image processing unit is arranged to operatively move the focusing frame by means of signals from a keypad comprised by said portable device.

According to a fifteenth aspect of the invention, the image processing unit is arranged to operatively change the size of the focusing frame by means of signals from said keypad.

According to a sixteenth aspect of the invention, said portable imaging device is a cell phone.

According to a seventeenth aspect of the invention, a computer program product comprising a computer readable medium comprising thereon a computer program code means to make a portable imaging device execute, when said program is loaded in a portable communication device comprising: an image recording arrangement comprising a lens system and an image sensor for recording images; and a display for presentation of the recorded images; the steps of: moving a movable focusing frame covering a part of a recorded image presented on the display so as to identify an area of interest in the presented image; analyzing the image within the frame to obtain a setting required to focus the image within the frame; applying the obtained setting to the full presented image so as to focus the presented image at the depth defined by the current position of the movable focusing frame.

According to an eighteenth aspect of the invention, a computer program element comprises a computer program code means to male a portable communication device execute, when said program element is loaded in the portable communication device comprising: an image recording arrangement comprising a lens system and an image sensor for recording images; and a display for presentation of the recorded images; the steps of: moving a movable focusing frame covering a part of a recorded image presented on the display so as to identify an area of interest in the presented image; analyzing the image within the frame to obtain a setting required to focus the image within the frame; applying the obtained setting to the full presented image so as to focus the presented image at the depth defined by the current position of the movable focusing frame.

An advantage provided by aspects of the present invention is that a user of the portable communication device receives an improved control of the focusing of the image. Hence, the user is not required to perform a careful focusing or to rely on maneuvering and aiming a comparably slow mechanical autofocus function at the time of recording. In addition, the need for large depth of field (i.e., the distance in front of and behind an object that appears to be in focus in an image) can be relaxed if desired. This implies that a larger aperture can be used in the lens system increasing the amount of light impinging on the image sensor, which improves the signal to noise ratio for the image recorded by the sensor.

Further advantages of the present invention and embodiments thereof will appear from the following detailed description of the invention.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

The present invention relates to portable devices comprising an imaging system. In particular, the invention relates to portable communication devices that include an imaging system. However, the invention is by no means limited to communication devices. Rather, aspects described herein can be applied to any suitable portable device comprising a suitable imaging system.

Figure 1:
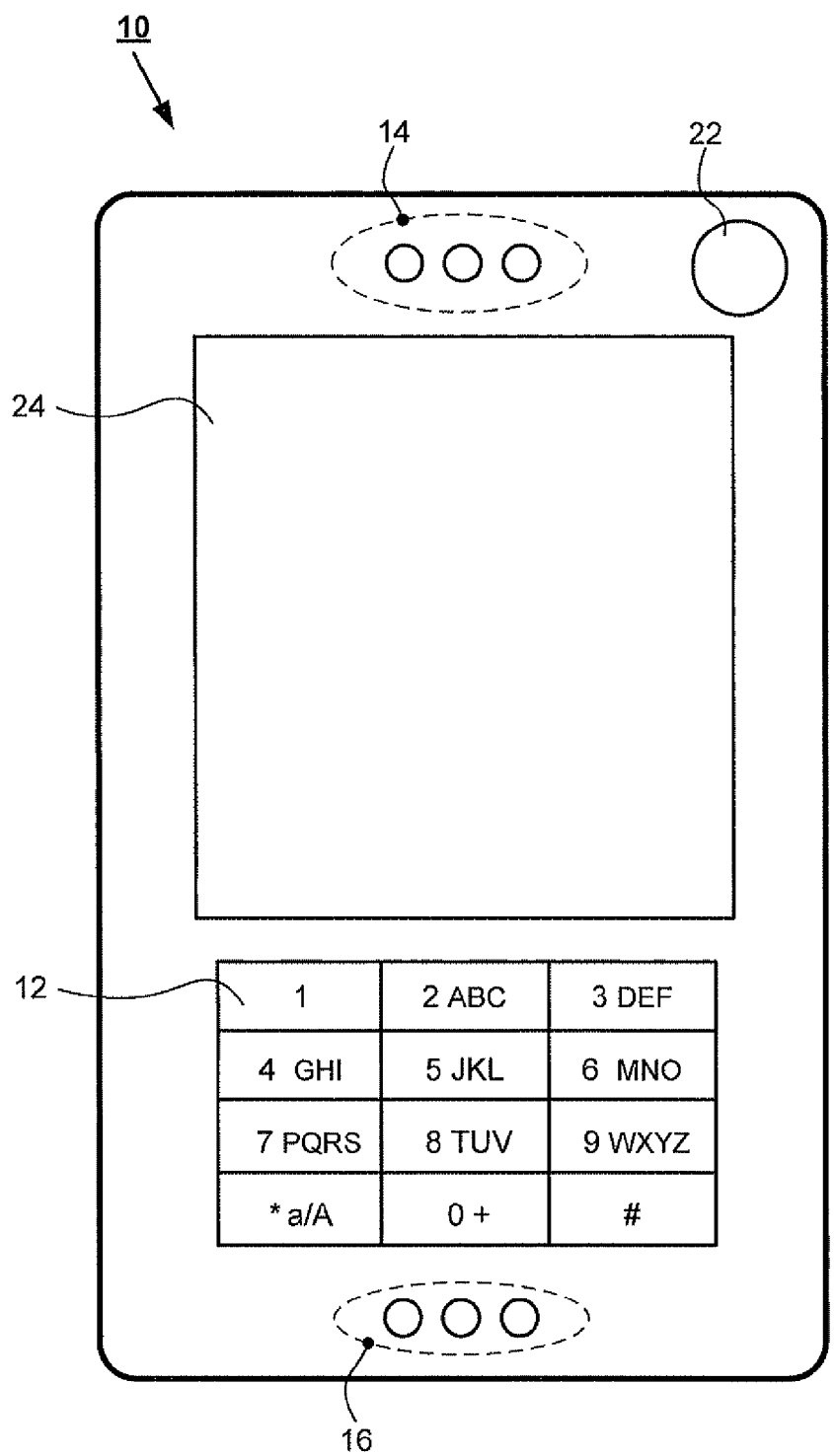
FIG. 1 shows a portable communication device in the form of a cellular phone.

A portable communication device 10 according to a preferred embodiment of the invention is shown in FIG. 1. In the preferred embodiment, the device is a cellular phone 10 having a keypad 12, a loudspeaker 14, and a microphone 16. The keypad 12 is used for entering information, such as selection of functions and responding to prompts. Here, it should be clarified that the keypad 12 may be of any suitable kind, including but not limited to keypads with suitable push-buttons, as well as suitable touch-buttons and/or a combination of different suitable button arrangements. The loudspeaker is used for presenting sounds to the user and the microphone 16 is used for sensing the voice from a user. In addition, the phone 10 includes an antenna, which is used for communication with other users via a network. However, the antenna may be built into the phone 10 and hence is not shown in FIG. 1.

Moreover, the phone 10 comprises a camera arrangement 22 for enabling pictures and/or movie shots to be digitally recorded by the phone 10. It is preferred that the camera arrangement 22 includes a lens and/or a lens system and a image sensor, such as an CCD (Charged Couple Device) image sensor, that includes an integrated circuit containing an array of linked, or coupled, capacitors sensitive to the light. It should be understood that other image sensors are clearly conceivable, e.g., an APS (Active Pixel Sensor) that includes an integrated circuit containing an array of pixels, each containing a photo detector as well as three or more transistors. The APS can be produced by an ordinary CMOS process and it consumes less power that the traditional CCD.

In addition, the phone 10 includes a display 24 for displaying functions and prompts to a user of the phone 10. The display 24 is also utilized for presenting images recorded by the camera arrangement 22. Here, it should be emphasized that the display 24 is preferably arranged to operatively present images previously recorded as well as images currently recorded by the camera arrangement 22 of the phone 10. In other words, it is preferred that the display 24 can operate both as a view finder and as presentation device for previously recorded images.

Before proceeding, it should be emphasized that the cellular phone 10 in FIG. 1 is just one example of a portable device in which the invention can be implemented. The invention can for instance also be used in a PDA (personal digital assistant), a palm top computer, a lap top computer or a smartphone or any other suitable portable device, e.g., such as a digital camera.

Figure 2:
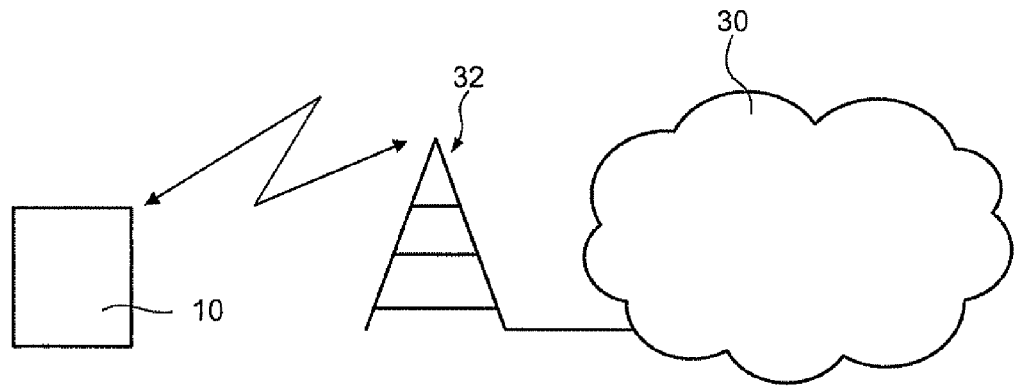
FIG. 2 shows the phone in FIG. 1 connected to a cellular network.

FIG. 2 shows the phone 10 connected to a cellular network 30 via a base station 32. The network 30 is typically global system for mobile communication (GSM) or a general packet radio service (GPRS) network, or any other 2G, 2.5G or 2.75G network. It is of course also possible that the network is a 3G network, such as a wideband code division multiple access (WCDMA) network. However, the network 30 does not have to be a cellular network, but can be some type of network, such as Internet, a corporate intranet, a local area network (LAN) or a wireless LAN.

Figure 3:
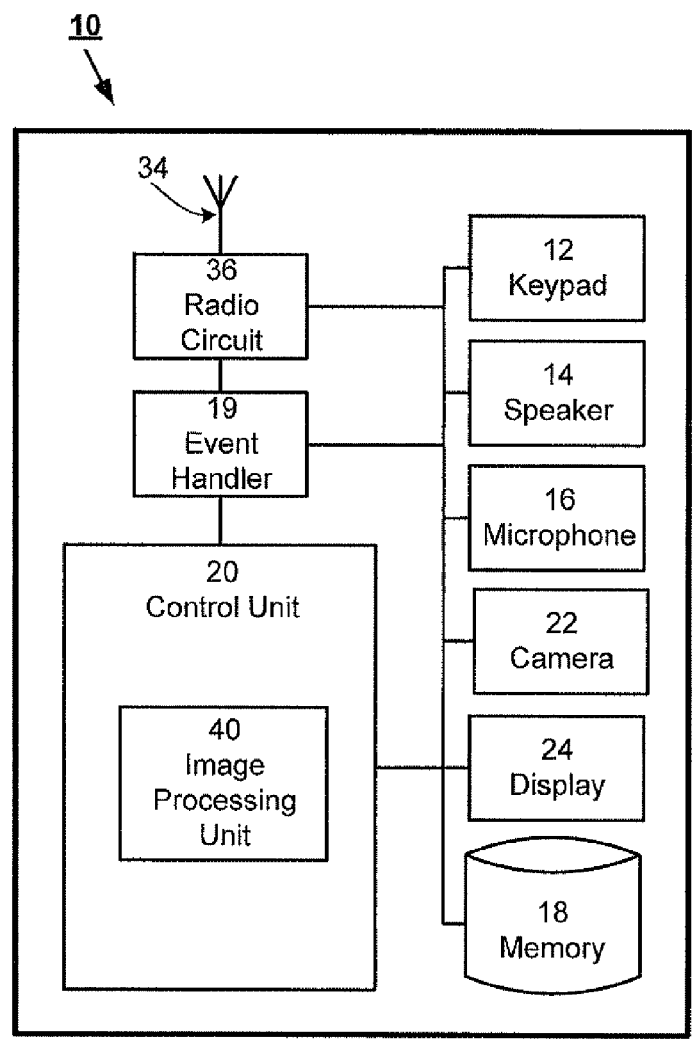
FIG. 3 shows a block schematic of the relevant parts of the phone in FIG. 1.

FIG. 3 shows parts of the interior of the cellular phone 10 being relevant for aspects described herein. As previously explained, it is preferred that the phone 10 includes keypad 12, a speaker 14, a microphone 16, a camera arrangement 22 and a display 24. In addition, the phone 10 is preferably provided with a memory 18 for storing data files, such as image files produced by the camera arrangement 22. The memory 18 may be any suitable memory type used in portable devices.

In addition, the phone 10 includes an antenna 34 connected to a radio circuit 36 for enabling radio communication with the network 30 in FIG. 2. The radio circuit 36 is in turn connected to an event handling unit 19 for handling such events as outgoing and incoming communication to and from external units via the network 30, e.g., calls and messages, e.g., SMS (Short Message Service) messages and MMS (Multimedia Messaging Service) messages.

The phone 10 is also provided with a control unit 20 for controlling and supervising the operation of the phone 10. The control unit 20 may be implemented by means of hardware and/or software, and it may be comprised of one or several hardware units and/or software modules, e.g., one or several processor units provided with or having access to the appropriate software and hardware required for the functions required by the phone 10, as is well known by those skilled in the art.

As can be seen in FIG. 3, in a preferred embodiment, the control unit 20 is connected to the keypad 12, the speaker 14, the microphone 16, the event handling unit 19, the display 24, the camera 22, the radio unit 36 and the memory 18. This enables the control unit 20 to control and communicate with these units to, for example, exchange information and instructions with the units.

Of particular interest in connection with the exemplifying embodiment now discussed, is that the control unit 20 is provided with an image processing unit 40 for processing images recorded by the camera arrangement 22. Being a part of the control unit 20 implies that the image processing unit 40 may be implemented by means of hardware and/or software, and it may also be comprised of one or several hardware units and/or software modules, e.g., one or several processor units provided with or having access to the software and hardware appropriate for the functions required.

The image processing unit 40 is particularly adapted to process images recorded by the camera arrangement 22 so as to change the depth at which a recorded image is focused. In particular, the image processing unit 40 is adapted to change the depth at which an image is focused depending on the position of a movable focusing frame covering a part of a recorded image shown on the display 24.

It is preferred that the focusing frame has the shape of a square or a rectangle or some other polygonal shape. However, other shapes are clearly conceivable, e.g., a circle or an oval or a polygonal shape with rounded or slanted corners. It is further preferred that the focusing frame covers less than half of the area of the displayed image, and more preferably less than 25% of the area of the displayed image, and even more preferably less than 10% of the area of the displayed image.

Preferably, the focusing frame is moved to various positions in the display 24 by means of one or several buttons on the keypad 12, e.g., a joystick or arrow button(s). Moving the focusing frame on the display 24 is preferably performed by means of the control unit 20 receiving information from the keypad 12 and commanding the display to move the focusing frame depending on the received information. Moving a frame across a display depending on the joystick or button(s) pressed on a keypad is well known to those skilled in the art of, e.g., mobile phones in connection with various menu systems used in the phone 10, etc. It should be added that the size of the movable focusing frame can be changed in a similar way by using joystick or button(s) pressed on the keypad 12 of the cell phone 10. This enables a focusing on small objects by means of a small frame, as well as an average focus of several small objects by using a larger frame. In short, it enables an adjustment of the size of the focusing frame to fit the object or objects to be focused.

Before proceeding, it should be emphasized that in addition to the components and units shown in FIG. 3, there may be further components and units present in the phone 10. The components and units shown in FIG. 3 may also be connected to additional components and units than illustrated.

Figure 4A:
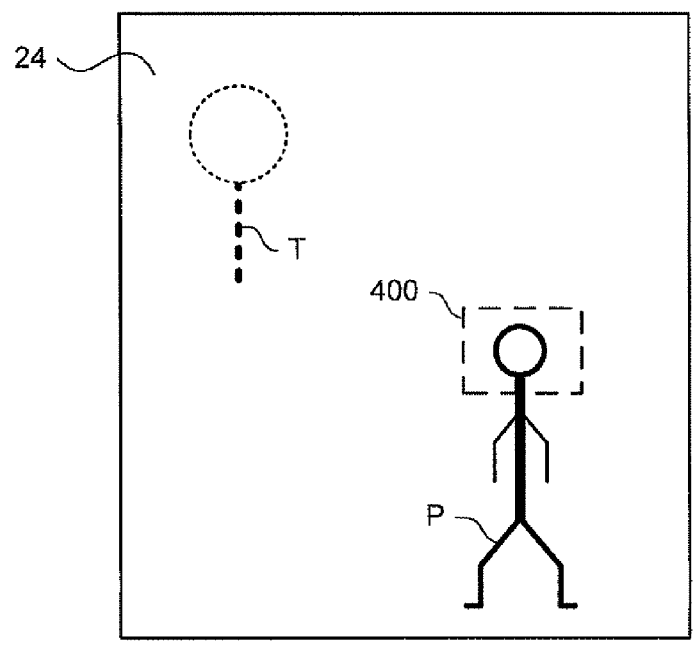
FIG. 4a illustrates the display of the device in FIG. 1 presenting an exemplifying and schematic image.
Figure 4B:
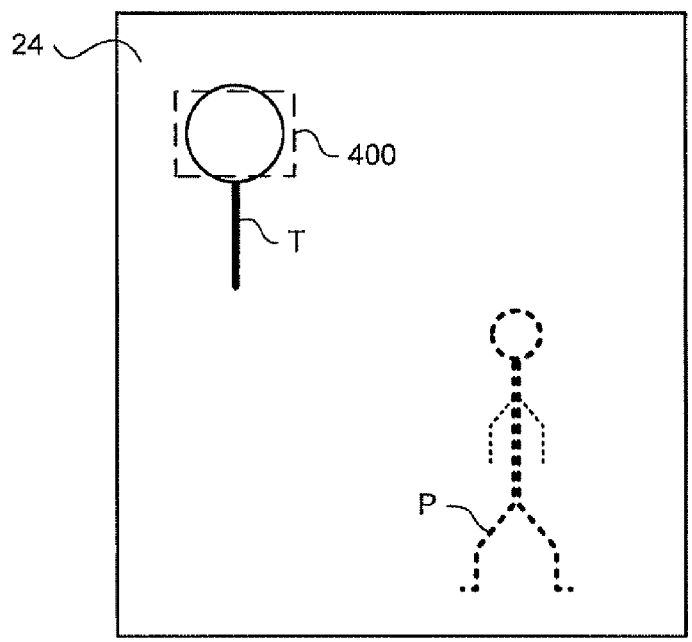
FIG. 4b illustrates the display of the device in FIG. 1 presenting an exemplifying and schematic image.
Figure 5:
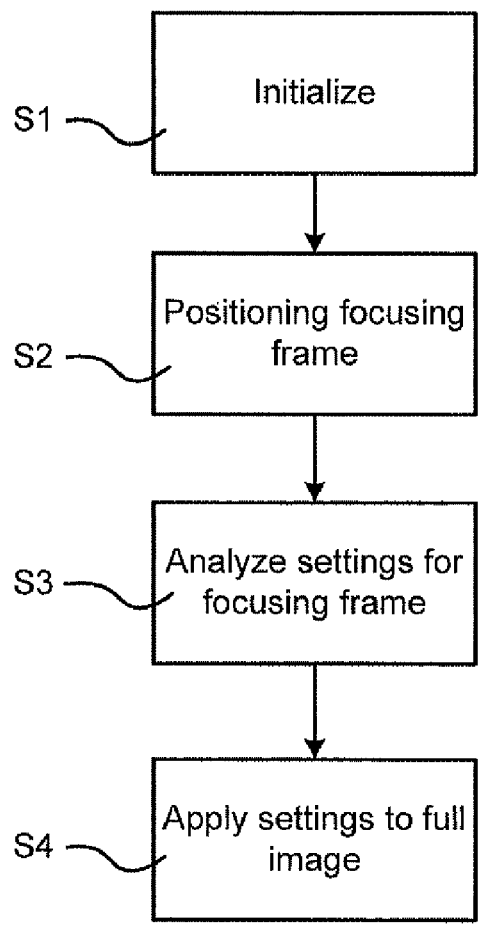
FIG. 5 shows a flow chart of a method of performing the method according to a preferred embodiment of the invention.

Attention is now directed towards the function of an exemplifying embodiment of the present invention, which will be described with reference to FIG. 1-3 together with FIGS. 4a and 4b illustrating the display 24 presenting an exemplifying and schematic image, and FIG. 5 showing a flow chart of a preferred embodiment of a method according to the invention.

As previously explained, an exemplifying portable communication device in the form of cellular phone 10 according to an embodiment of the present invention is adapted to record images by means of the camera arrangement 22 provided with a lens or lens system and an image sensor. The image sensor is preferably a CCD (Charged Couple Device) or an APS (Active Pixel Sensor) or a similar array of photo sensitive sensors. The images are preferably stored as data files in the memory 18 or in any other suitable memory arranged in the phone 10. These functions are well known to those skilled in the art of cellular mobile phones and they can be found in many modern cell phones of today, e.g., in the Sony Ericsson cellular phone model K700i and others.

In addition, as will be explained in more detail below, the images recorded by the camera arrangement 22 can be subjected to image processing that changes the depth at which an image is focused depending on the position of a movable focusing frame covering a part of a recorded image shown on the display 24. In other words, the image processing computes sharp images focused at different depths in the image defined by a movable focusing frame.

FIG. 4a and FIG. 4b illustrate the display 24 of the device in FIG. 1 presenting an exemplifying and schematic image. The image comprises a schematically illustrated person P in a near position in the foreground and a schematically illustrated tree T in a distant position in the background. FIG. 4a shows the focusing frame 400 positioned so as to cover the face of the person P, which implies that the image according to the present invention will be focused so that the face of the person P is sharp, whereas the tree T in the background is out of focus. FIG. 4b shows the focusing frame 400 being moved so as to cover the crown of the tree T, which implies that the image according to the present invention will be focused so that the crown of the tree T is sharp, whereas the person P in the foreground is out of focus. Hence, by moving the frame 400, covering a part of the image presented on the display 24, to different positions in the presented image it will be possible to refocus the image substantially as desired.

An advantage provided by the present invention is that a user of the portable communication device 10 receives an improved control of the focusing of the image. Hence, the user is not required to perform a careful focusing or to rely on maneuvering and aiming a comparably slow mechanical autofocus function at the time of recording. Rather, according to the present invention, a rough focusing at the time of recording is sufficient. The user can then conveniently decide the depth at which the recorded image is to be focused by positioning the movable focusing frame 400 to the area of interest. In addition, the need for large depth of field (i.e., the distance in front of and behind an object that appears to be in focus in an image) can be relaxed if desired. This implies that a larger aperture can be used in the lens system increasing the amount of light impinging on the image sensor, which improves the signal to noise ratio for the image recorded by the sensor.

The steps in an exemplifying method of changing the depth at which an image is focused depending on the position of a movable focusing frame covering a part of a recorded image shown on the display 24 will now be described with reference to the exemplifying flow chart in FIG. 5. The method is preferably implemented by means of the image processing unit 40 as schematically illustrated in FIG. 3.

In a first step S1 of an exemplifying method according to an embodiment of the present invention, the focusing function preformed by the imaging processing unit 40 is initialized. The initialization includes such actions as allocating a focusing frame 400 on the image presented by the display 24 and activating of suitable button(s) or the like on the keypad 12 or similar so that a user of the cell phone 10 can move the presented focusing frame 400 to a desired position in the presented image.

In a second step S2 of the exemplifying method the focusing frame 400 is moved to the area of interest by the user actuating buttons or the like on the keypad 12 or similar. The area of interest identified by the user is then selected, e.g., in that the user pushes a further button or the like on the keypad 12 or similar, or in that the user simply stops moving the focus frame 400 for a short period. The position of the focusing frame 400, being moved to a certain area of interest in the presented image, is then transferred to the imaging processing unit 40. The imaging processing unit 40 uses this information to focus the part of the image delimited by the focusing frame 400, as will be further explained below.

In a third step S3, the image within the focusing frame 400 is analyzed so as to obtain a setting required to focus the image within the frame 400. Here, several known image processing techniques can be utilized.

An exemplifying arrangement and method for producing sharp photographs focused at different depths in a recorded image is presented in the paper "Light Field Photography with a Hand-Held Plenoptic Camera" by Ren Ng, Marc Levoy, Matieu Bredif, Gene Duval, Mark Horowitz, Pat Hanrahan, published in Stanford Tech Report CTSR 2005-02. The paper presents a camera that samples the 4D light field on its sensor in a single photographic exposure. This is achieved by inserting a microlens array between the sensor and main lens, creating a plenoptic camera. Each microlens measures not just the total amount of light deposited at that location, but how much light arrives along each ray. By re-sorting the measured rays of light to where they would have terminated in slightly different, synthetic cameras, it is possible to compute sharp photographs focused at different depths. In addition, a linear increase in the resolution of images under each microlens results in a linear increase in the sharpness of the refocused photographs. This property makes it possible to extend the depth or depth interval within which an image can be focused. This can be done without reducing the aperture, which enables shorter exposure time and/or lower image noise due to the increased amount of light received by the image sensor.

Similarly, a technique called Wavefront Coding™ utilizes an image processing system for increasing the depth of field of an ordinary lens in an incoherent optical system. The Wavefront Coding™ system incorporates an encoding special purpose optical mask into the incoherent lens system. See, for example, U.S. Pat. No. 5,748,371 to Cathey et al. The optical mask is preferably designed to cause the optical transfer function to remain essentially constant within some range from the in-focus position. Signal processing of the resulting intermediate image decodes (i.e., undoes) the optical transfer modifying effects of the mask, resulting in an in-focus image over an increased depth of field. In addition, U.S. Pat. No. 5,521,695 to Cathey et al. describes how a Wavefront Coding™ system can be utilized for estimating the range to various points within a scene by imaging the scene through an encoding optical mask and a lens onto an image sensor and then digitally processing the image recorded by the sensor so as to decode (i.e., undo) the encoding. The post processing of the image uses a digital filter to take advantage of the coded information for reconstructing a sharp image. By choosing between filters having different properties it is possible to decide at what preferred object distance the image shall be focused.

Another, example is disclosed in U.S. Pat. No. 6,154,574 to Paik et al. describing an imaging processing system for digitally focusing an out-of-focus image. Here, a defocused image is divided into sub-images of a predetermined size. An edge direction of each of the divided sub-images is estimated. Step responses with respect to the respective edge directions are calculated and a mean step response is obtained by averaging a predetermined number of the step responses. Point Spread Function (PSF) coefficients are then obtained using the mean step response, whereupon an image-blur transfer function is obtained using the PSF coefficients. An image restoration transfer function is then obtained by using the image blur transfer function. An original in-focused image is obtained by multiplying the image restoration transfer function by the defocused image in a frequency domain. Thus, an image can be restored, and the size and weight of the image processing system can be reduced.

Now, assume that the image to be focused according to an embodiment of the present invention is produced by a plenoptic imaging system as the one mentioned above. It is then possible to focus the image at a plurality of distances, e.g., at three different distances. By analyzing the image within the focusing frame 400, it can be determined which of the three settings produces the sharpest image within the frame 400. This setting can then be used for focusing the full image. Hence, it will be possible to focus the entire image at the depth in the image defined by the position of the movable focusing frame 400. Naturally, there may be more than three images and the procedure may be iterative. It should also be added that a detection of sharpness (selecting the focus setting that renders the best sharpness) is routinely done in all digital cameras having traditional auto focus. For this purpose the image can, e.g., be analyzed by means of an edge detection algorithm, according to which the setting that shows most edges within the frame 400 represents the sharpest image, cf. e.g., published patent application U.S. 2006/0062484 A1 (Aas et al).

In another embodiment of the present invention, the image to be focused may have been produced by a Wavefront Coding™ system as mentioned above or similar. It is then possible to choose a plurality of digital filters each focusing the image at a different distance, e.g., to choose three different filters focusing the image at three different distances. By analyzing the image within the focusing frame 400, it can be determined which of the three filter settings produces the sharpest image within the frame 400. This setting can then be used for focusing the full image. Hence, it will be possible to focus the entire image at the depth in the image defined by the position of the movable focusing frame 400. Again, there may be more than three focused images to select among and the procedure may be iterative, and again, the image within the frame 400 may, e.g., be analyzed using an edge detection algorithm whereby the setting that shows most edges represents the sharpest image, see e.g., published patent application U.S. 2006/0062484 A1 (Aas et al.).

In still another embodiment of the present invention, the image may be focused by utilizing the technique in U.S. Pat. No. 6,154,574 (Paik et. al). The sub-frames in Paik et al. are then positioned within the movable focusing frame 400 and an image restoration transfer function is obtained for the image delimited by the focusing frame 400. A full in-focused image—focused on the object(s) within the focusing frame 400—is then obtained by multiplying the image restoration transfer function by the entire defocused image in a frequency domain. Hence, it will be possible to focus the entire image at the depth in the image defined by the position of the movable focusing frame 400.

In a fourth step S4 the entire image (i.e., the full image) is focused at the depth in the image defined by the position of the movable focusing frame 400. This is accomplished by applying the particular setting focusing the image within the focusing frame 400 to the full image.

In the case of a plenoptic imaging system this may, e.g., correspond to choosing the full image that creates the sharpest image within the focusing frame 400. In the case of a Wavefront Coding System™ this may, e.g., correspond to choosing the digital filter that creates the sharpest image within the focusing frame 400. In the case of a sub-frame imaging system as in U.S. Pat. No. 6,154,574 (Paik et al) this may, e.g., correspond to multiplying the image restoration transfer function obtained for the image within the focusing frame 400 by the entire defocused image in a frequency domain.

Figure 6:
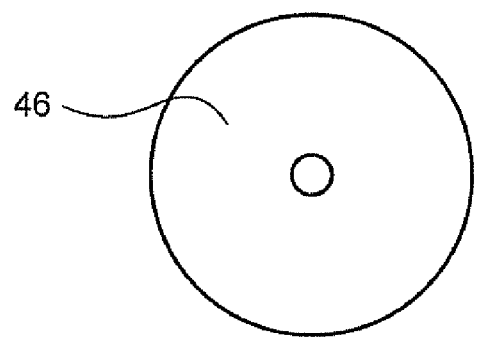
FIG. 6 shows a CD ROM on which program code for executing the method according to the invention is provided.

In general, as previously explained, it is preferred that the imaging processing unit 40, arranged to perform the exemplifying method described above, is provided in the form of one or more processors with corresponding memory containing the appropriate software in the form of a program code. However, the program code can also be provided on a data carrier such as a CD ROM disc 46 as depicted in FIG. 6 or an insertable memory stick, which will perform the invention when loaded into a computer or into a phone having suitable processing capabilities. The program code can also be downloaded remotely from a server either outside or inside the cellular network or be downloaded via a computer like a PC to which the phone is temporarily connected.

The present invention has now been described with reference to exemplifying embodiments. However, the invention is not limited to the embodiments described herein. On the contrary, the full extent of the invention is only determined by the scope of the appended claims and their equivalents.

The invention claimed is:

1. A method for changing a depth at which a recorded image is focused in a portable imaging device, the method comprising:
   recording an image using an image recording arrangement of the portable imaging device;
   presenting the recorded image using a display arrangement of the portable imaging device;
   moving a focusing frame covering a part of the recorded image, presented using the display arrangement, to identify an area of interest in the presented image;
   analyzing the area of interest within the focusing frame to obtain a setting required to focus the area of interest within the focusing frame,
   wherein analyzing the area of interest to obtain the setting comprises:
      obtaining a plurality of intermediate images from the presented image, wherein each of the plurality of intermediate images is focused at a unique distance within the presented image; and
      determining a setting for an intermediate image, of the plurality of intermediate images, that provides a sharpest image within the focusing frame relative to other one or more of the plurality of intermediate images; and
   applying the obtained setting to an entirety of the presented image to digitally focus the presented image at a depth defined by a current position of the focusing frame.

2. The method of claim 1, wherein the presented image is recorded by a plenoptic camera arrangement and the plurality of intermediate images are obtained by computing a plurality of synthetic camera settings, wherein each synthetic camera setting, of the plurality of synthetic camera settings, produces an image focused at a unique distance within the presented image.

3. The method of claim 1, wherein the presented image is recorded by a wavefront coding arrangement and the plurality of intermediate images are obtained by using a plurality of filter settings, wherein each filter setting, of the plurality of filter settings, produces an image focused at a unique distance within the presented image.

4. The method of claim 1, wherein analyzing the area of interest to obtain said setting comprises:
  dividing the area of interest into sub-images of a predetermined size;
  estimating an edge direction of each of the divided sub-images;
  calculating step responses for respective edge directions of the divided sub-images;
  obtaining a mean step response by averaging a predetermined number of the step responses;
  obtaining Point Spread Function (PSF) coefficients using the mean step response;
  obtaining an image blur transfer function using the PSF coefficients; and
  obtaining an image restoration transfer function setting using the image blur transfer function.

5. The method of claim 1, wherein moving the focusing frame comprises moving the focusing frame using a keypad of the portable imaging device.

6. The method of claim 5, further comprising:
  changing the size of the focusing frame using the keypad.

7. The method of claim 1, wherein the portable imaging device comprises a cell phone.

8. A portable imaging device, comprising:
  an image recording arrangement comprising a lens system and an image sensor for recording images,
  a display for presentation of the recorded images,
  an image processing unit for changing a depth at which a recorded image is focused in the portable imaging device, wherein the image processing unit is configured to:
    move a focusing frame covering a part of a particular recorded image presented on the display to identify an area of interest in the particular presented image;
    analyze the area of interest to obtain a setting required to focus the particular presented image within the frame,
    wherein the image processing unit analyzes the area of interest to obtain said setting by being arranged to operatively:
      obtain a plurality of intermediate images from the particular presented image, wherein each intermediate image, of the plurality of intermediate images, is focused at a unique distance within the particular presented image, and
      determine the setting for an intermediate image, of the plurality of intermediate images, that provides a sharpest image, within the frame, relative to other one or more of the plurality of intermediate images; and
    apply the obtained setting to an entirety of the particular presented image to digitally focus the particular presented image at a depth defined by a current position of the focusing frame.

9. The portable imaging device of claim 8, wherein the particular presented image is recorded by a plenoptic camera arrangement,
  wherein the image processing unit is arranged to operatively obtain the plurality of intermediate images by computing a plurality of synthetic camera settings, and
  wherein each synthetic camera setting, of the plurality of synthetic camera settings, produces an image focused at a unique distance in the particular presented image.

10. The portable imaging device of claim 8, wherein the particular presented image is recorded by a wavefront coding arrangement,
  wherein the image processing unit is arranged to operatively obtain the plurality of intermediate images by using a plurality of filter settings, and
  wherein each filter setting, of the plurality of filter settings, produces an image focused at a unique distance in the particular presented image.

11. The portable imaging device of claim 8, wherein the image processing unit analyzes the area of interest to obtain said setting by being arranged to operatively:
  divide the area of interest into sub-images of a predetermined size;
  estimate an edge direction of each of the divided sub-images;
  calculate step responses for respective edge directions of the divided sub-images;
  obtain a mean step response by averaging a predetermined number of the calculated step responses;
  obtain Point Spread Function (PSF) coefficients using the mean step response;
  obtain an image blur transfer function using the PSF coefficients; and
  obtain an image restoration transfer function setting using the image blur transfer function.

12. The portable imaging device of claim 8, wherein the image processing unit is arranged to operatively move the focusing frame based on signals from a keypad included on the portable imaging device.

13. The portable imaging device of claim 12, wherein the image processing unit is arranged to operatively change a size of the focusing frame based on signals from said keypad.

14. The portable imaging device of claim 8, wherein the portable imaging device comprises a cell phone.

15. A non-transitory computer readable medium, having thereon computer program code embodied on the computer readable medium, to make a portable imaging device perform a method when said program code is loaded in a portable communication device, the method comprising:
  moving a focusing frame covering a part of a recorded image presented on a display, of the portable communication device, to identify an area of interest in the presented image;
  analyzing the area of interest to obtain a setting required to focus the area of interest,
  wherein analyzing the area of interest to obtain the setting comprises:
    obtaining a plurality of intermediate images from the presented image, wherein each of the plurality of intermediate images is focused at a unique distance within the presented image; and
    determining a setting for an intermediate image, of the plurality of intermediate images, that provides a sharpest image, within the focusing frame, relative to other one or more of the plurality of intermediate images; and
  applying the obtained setting to the presented image to digitally focus the presented image at a depth defined by a current position of the focusing frame.

16. A non-transitory computer readable medium, having thereon computer program code means embodied on the computer readable medium, to make a portable communication device execute, when said program element is loaded in the portable communication device, a method comprising:
  moving a focusing frame covering a part of a recorded image presented on a display, of the portable communication device, to identify an area of interest in the presented image;

analyzing the area of interest to obtain a setting required to focus the image within the focusing frame,
where analyzing the area of interest to obtain the setting includes:
  obtaining a plurality of intermediate images from the presented image, wherein each intermediate image, of the plurality of intermediate images, is focused at a unique distance within the presented image, and
  determining a setting for an intermediate image, of the plurality of intermediate images, that provides a sharpest image, within the focusing frame, relative to images provided by other one or more of the plurality of intermediate images; and
applying the obtained setting to the presented image so as to digitally focus the presented image at a depth defined by a current position of the focusing frame.

* * * * *